US011558158B2

(12) United States Patent
Shusterman et al.

(10) Patent No.: US 11,558,158 B2
(45) Date of Patent: Jan. 17, 2023

(54) METHODS AND DEVICES FOR DYNAMICALLY AVOIDING RADIO FREQUENCY INTERFERENCE

(71) Applicant: Intel Corporation, Santa Clara, CA (US)

(72) Inventors: Michael Shusterman, Portland, OR (US); John Fallin, Beaverton, OR (US); Ana M. Yepes, Hillsboro, OR (US); Dong-Ho Han, Beaverton, OR (US); Nasser A. Kurd, Portland, OR (US); Tomer Levy, Tel Aviv (IL); Ehud Reshef, Kiryat Tiv'on (IL); Arik Gihon, Rishon LeTsiyon (IL); Ido Ouzieli, Tel Aviv (IL); Yevgeni Sabin, Haifa (IL); Maor Tal, Ness Ziona (IL); Zhongsheng Wang, Portland, OR (US); Amit Zeevi, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 17/093,679

(22) Filed: Nov. 10, 2020

(65) Prior Publication Data

US 2022/0150006 A1    May 12, 2022

(51) Int. Cl.
*H04L 5/00* (2006.01)
*H04W 72/04* (2009.01)

(52) U.S. Cl.
CPC .......... *H04L 5/0035* (2013.01); *H04L 5/0007* (2013.01); *H04L 5/0037* (2013.01); *H04L 5/0073* (2013.01); *H04W 72/0453* (2013.01)

(58) Field of Classification Search
None
See application file for complete search history.

(56) References Cited

U.S. PATENT DOCUMENTS

| 7,085,536 B2 | 8/2006 | Silvester |
| 9,557,407 B1* | 1/2017 | Rezk ...................... H04K 3/822 |
| 2009/0109939 A1* | 4/2009 | Bhushan ............. H04W 72/082 370/337 |
| 2010/0158169 A1 | 6/2010 | Sreerama et al. |
| 2010/0234061 A1* | 9/2010 | Khandekar ........... H04W 52/54 455/522 |
| 2012/0071102 A1* | 3/2012 | Palomar ................ H04W 16/14 455/63.1 |

(Continued)

OTHER PUBLICATIONS

Extended Search Report for the European Patent Application No. 21195971.3, dated Mar. 14, 2022, 8 pages (For reference purposes only).

*Primary Examiner* — Phirin Sam
(74) *Attorney, Agent, or Firm* — Viering, Jentschura & Partner mbB

(57) ABSTRACT

A wireless communication device for communicating across a wireless communication channel includes one or more processors configured to determine whether a further device is generating a radio frequency interference at an operating frequency; transmit a request message to the further device requesting the further device vacate the operating frequency based on the determination that the further device is generating radio frequency interference; receive a response message from the further device; and generate an instruction based on the response message.

18 Claims, 7 Drawing Sheets

(56) References Cited

U.S. PATENT DOCUMENTS

| | | | |
|---|---|---|---|
| 2013/0150106 A1 | 6/2013 | Bucknell et al. | |
| 2014/0128080 A1* | 5/2014 | Mohan | H04W 36/0061 |
| | | | 455/437 |
| 2015/0304056 A1* | 10/2015 | Guo | H04B 1/1027 |
| | | | 455/63.1 |
| 2016/0183220 A1* | 6/2016 | Rashid | H04W 72/042 |
| | | | 370/329 |
| 2017/0245278 A1* | 8/2017 | Xue | H04L 27/2602 |
| 2017/0257070 A1* | 9/2017 | Modi | H01L 29/66242 |
| 2017/0303220 A1* | 10/2017 | Sadeghi | H04W 72/0453 |
| 2018/0132240 A1* | 5/2018 | Yang | H04W 36/00 |
| 2018/0180714 A1* | 6/2018 | Zur | H04K 3/822 |
| 2018/0373304 A1* | 12/2018 | Davis | G06F 1/3206 |
| 2019/0132743 A1* | 5/2019 | Vanka | H04W 16/10 |
| 2021/0018549 A1* | 1/2021 | Embleton | H05K 7/1498 |

\* cited by examiner

| Channel Center Frequency | 20 MHz Channel | 40 MHz Channel | 80 MHz Channel | 160 MHz Channel |
|---|---|---|---|---|
| 5945 | 1 | 3 | 7 | 15 |
| 5965 | 5 | | | |
| 5985 | 9 | 11 | | |
| 6005 | 13 | | | |
| 6025 | 17 | 19 | 23 | |
| 6045 | 21 | | | |
| 6065 | 25 | 27 | | |
| 6085 | 29 | | | |
| 6105 | 33 | 35 | 39 | 47 |
| 6125 | 37 | | | |
| 6145 | 41 | 43 | | |
| 6165 | 45 | | | |
| 6185 | 49 | 51 | 55 | |
| 6205 | 53 | | | |
| 6225 | 57 | 59 | | |
| 6245 | 61 | | | |
| 6265 | 65 | 67 | 71 | 79 |
| 6285 | 69 | | | |
| 6305 | 73 | 75 | | |
| 6325 | 77 | | | |
| 6345 | 81 | 83 | 87 | |
| 6365 | 85 | | | |
| 6385 | 89 | 91 | | |
| 6405 | 93 | | | |
| 6425 | 97 | 99 | 103 | 111 |
| 6445 | 101 | | | |
| 6465 | 105 | 107 | | |
| 6485 | 109 | | | |
| 6505 | 113 | 115 | 119 | |
| 6525 | 117 | | | |
| 6545 | 121 | 123 | | |
| 6565 | 125 | | | |
| { | } | { | } | } |
| 6905 | 193 | 195 | 199 | 207 |
| 6925 | 197 | | | |
| 6945 | 201 | 203 | | |
| 6965 | 205 | | | |
| 6985 | 209 | 211 | 215 | |
| 7005 | 213 | | | |
| 7025 | 217 | 219 | | |
| 7045 | 221 | | | |
| 7065 | 225 | 227 | Not Used | |
| 7085 | 229 | | | |
| 7105 | 233 | Not Used | | |

| DVFS 512 | Primary Rate 514 | Alternate Rate 516 |
|---|---|---|
| 0 | 2200 | None |
| 1 | 4800 | None |
| 2 | 6400 | 6200 |
| 3 | 5400 | None |

510

518

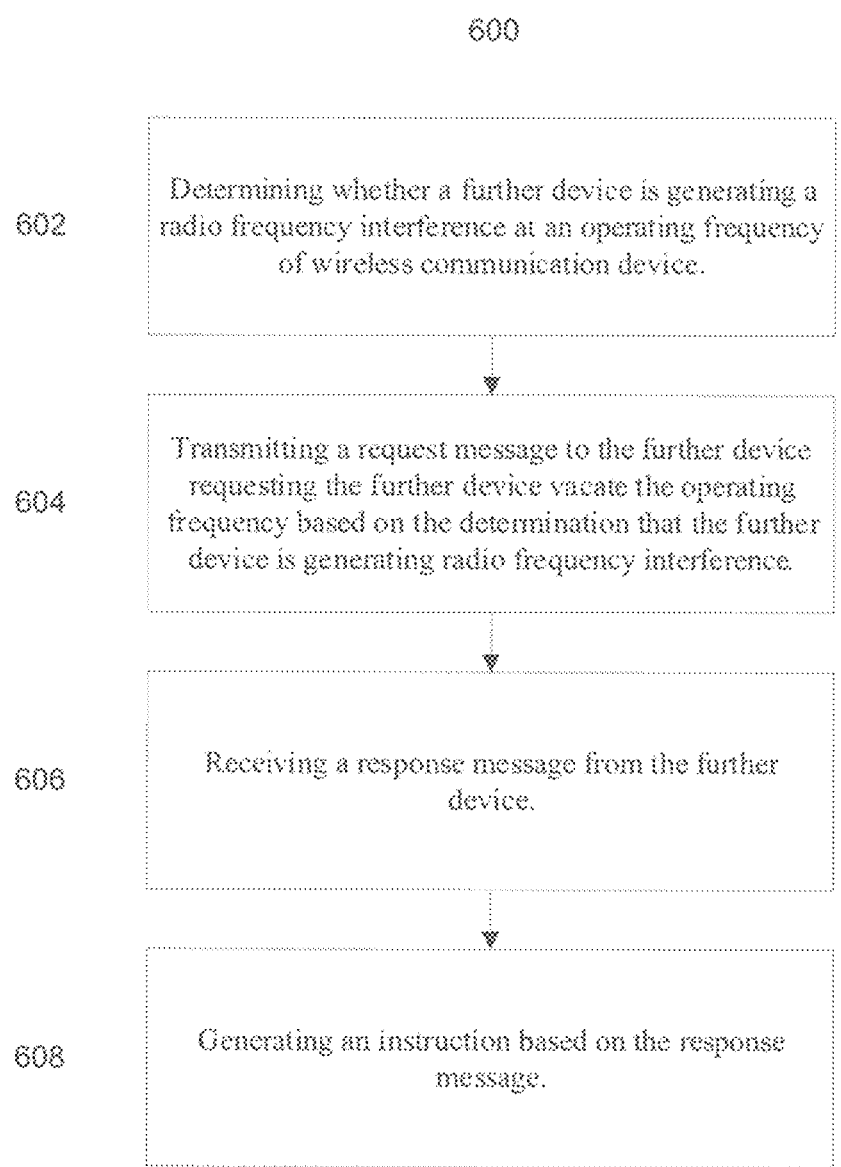

METHODS AND DEVICES FOR DYNAMICALLY AVOIDING RADIO FREQUENCY INTERFERENCE

TECHNICAL FIELD

Various aspects relate generally to methods and devices for dynamically avoiding radio frequency interference (RFI).

BACKGROUND

Wireless communication systems may include one or more unintentional radio frequency (RF) emitting devices which cause RFI. The RFI may cause performance degradation or completely inhibit wireless communication device operation. For example, wireless communication devices using wireless communication technology such as Wireless LAN (WLAN), Wireless WAN (WWAN), Bluetooth (BT), ultrawideband (UWB), or any other wireless communication device operating in a platform supporting licensed or unlicensed bands. For example, Wi-Fi, LTE, or 5GNR.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 5A and 5B show an exemplary RFI avoidance technique according to some aspects.

FIG. 6 shows an exemplary flow chart for avoiding RFI according to some aspects.

DESCRIPTION

Figure 1:
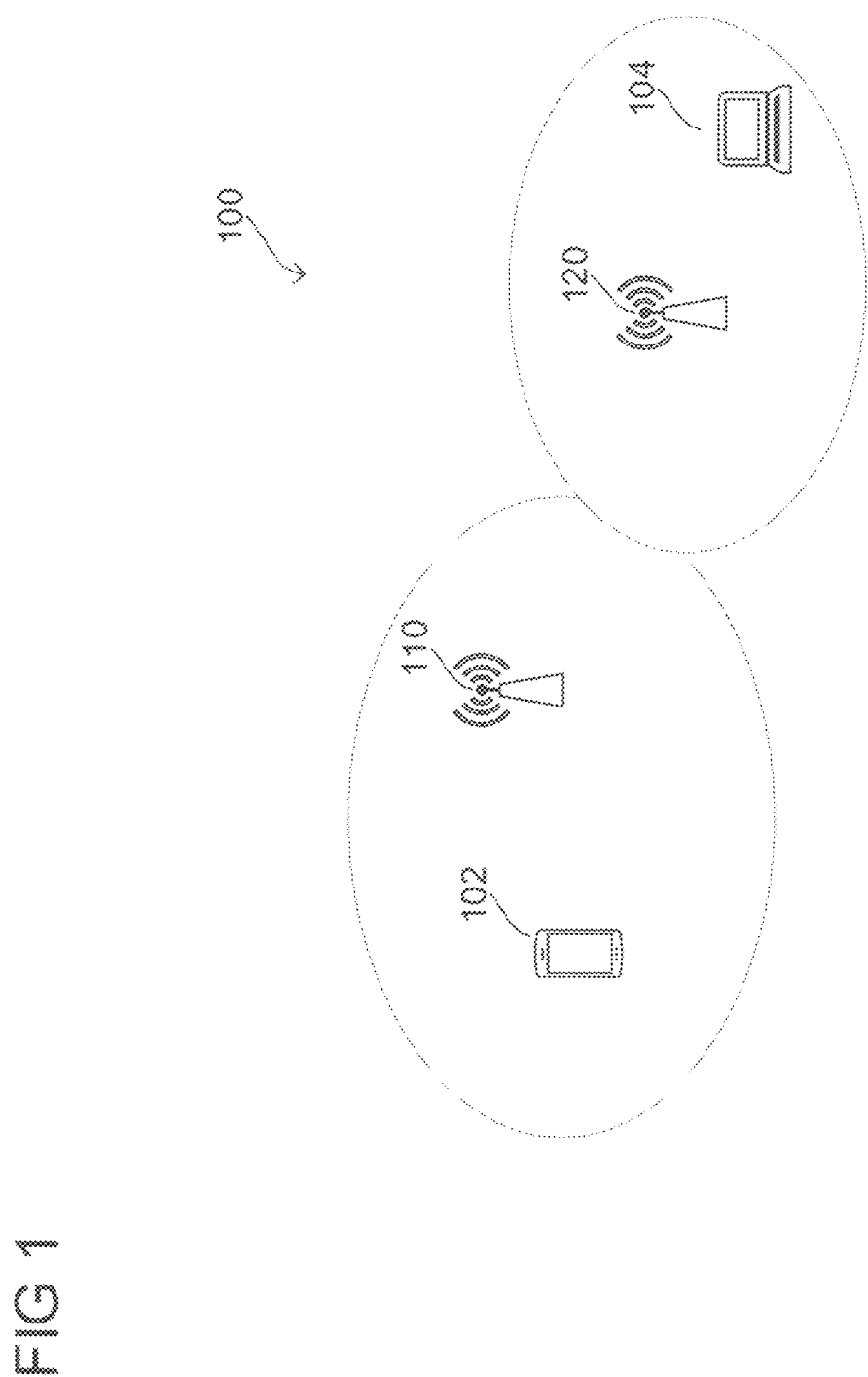
FIG. 1 shows an exemplary radio communication network according to some aspects.

The following detailed description refers to the accompanying drawings that show, by way of illustration, specific details and aspects of embodiments in which the disclosure may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "reduced subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the wireless transmission of radio signals) and logical transmission (e.g., the transmission of digital data over a logical software-level connection). For example, a processor (or controller or physical layer) may transmit or receive data over a software-level connection with another processor (or controller or physical layer) in the form of radio signals, where the physical transmission and reception is handled by radio-layer components such as RF transceivers and antennas, and the logical transmission and reception over the software-level connection is performed by the processors.

Many wireless communication technologies use beamforming to increase link strength between transmitter and receiver. The Third Generation Partnership Project's (3GPP) Fifth Generation (5G) New Radio (NR) standard, for example, includes mechanisms for beamforming in both the transmit and receive directions. Focusing on the terminal side, a terminal device (e.g., a UE) may identify a receive antenna beam and a transmit antenna beam for a given network access node (e.g., gNodeB). In the receive direction, the terminal device can then increase link strength by receiving signals from the network access node with the receive antenna beam. Similarly, in the transmit direction the terminal device can boost link strength by transmitting signals to the network access node with the transmit antenna beam.

Figure 2:
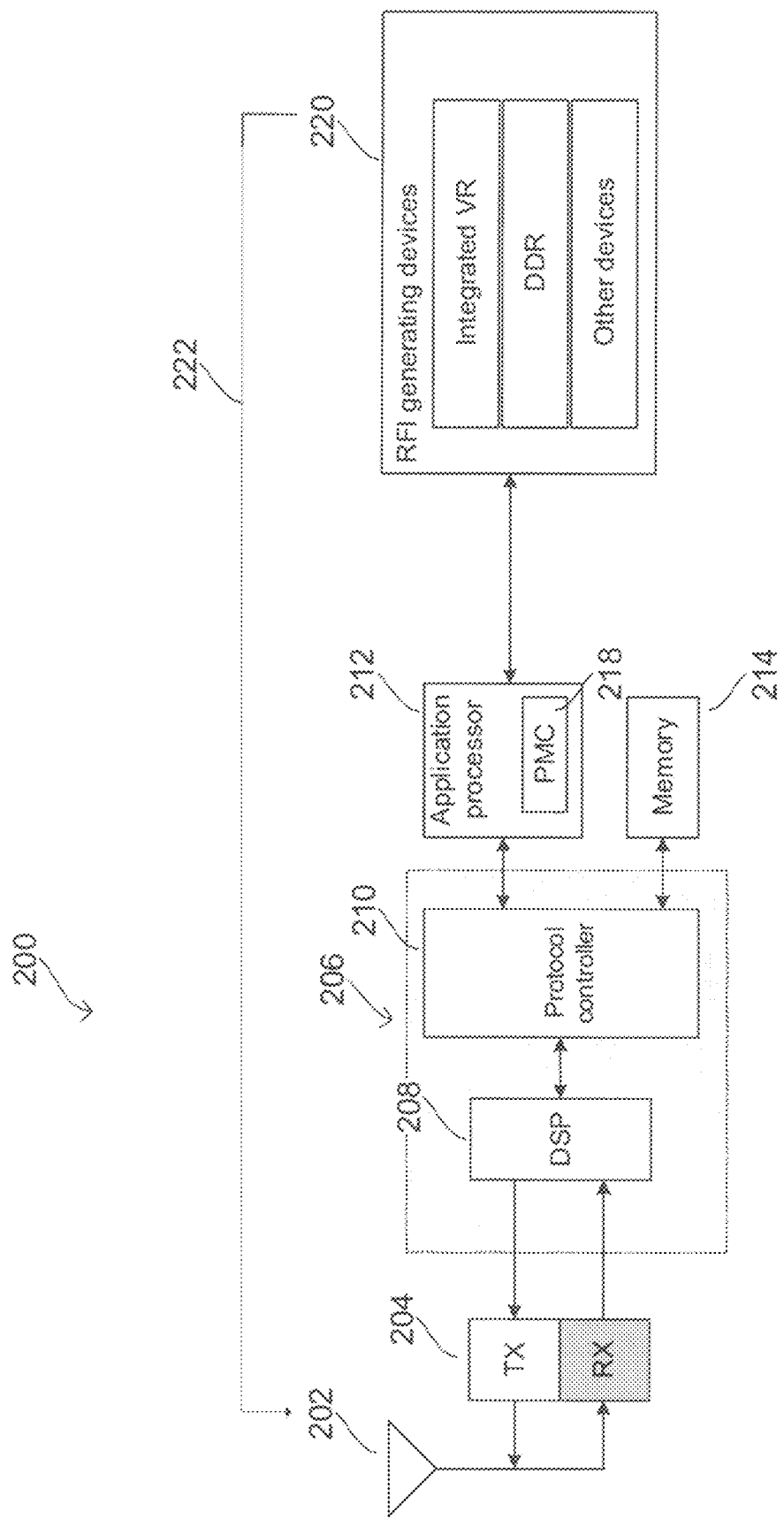
FIG. 2 shows an exemplary internal configuration of a terminal device according to some aspects.

FIGS. 1 and 2 depict a general network and device architecture for wireless communications. FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/Wi-Fi, Bluetooth, 5G NR, mmWave, WiGig, etc.), these examples are illustrative and may be readily applied to any other type or configuration of radio access network. The number of network access nodes and terminal devices in radio communication network 100 is exemplary and is scalable to any amount.

In an exemplary short-range context, network access node 110 and 120 may be access points (APs, e.g., WLAN or Wi-Fi APs), while terminal device 102 and 104 may be short range terminal devices (e.g., stations (STAs)). Network access nodes 110 and 120 may interface (e.g., via an internal or external router) with one or more external data networks. In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data).

The radio access network and core network of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, Wi-Fi, mmWave, 5G NR, and the like, any of which may be applicable to radio communication network 100.

FIG. 2 shows an exemplary internal configuration of terminal device 200 according to some aspects, which may include antenna system 202, radio frequency (RF) transceiver 204, baseband modem 206 (including digital signal processor 208 and protocol controller 210), application processor 212, and memory 214. Terminal device 200 may be any one of terminal device 102 or 104. Although not explicitly shown in FIG. 2, in some aspects terminal device 200 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 200 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 200 shown in FIG. 2 depicts only a single instance of such components.

Terminal device 200 may transmit and receive wireless signals with antenna system 202. Antenna system 202 may be a single antenna or may include one or more antenna arrays that each include multiple antenna elements. For example, antenna system 202 may include an antenna array at the top of terminal device 200 and a second antenna array at the bottom of terminal device 200. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specifically execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 200 may be configured to operate according to one or more radio communication technologies. Digital signal processor 208 may be responsible for lower-layer processing functions (e.g. Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 200 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 200 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 200 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 200 may also include application processor 212 and memory 214. Application processor 212 may be a CPU, and may be configured to handle the layers above the protocol stack, including the transport and application layers. Application processor 212 may be configured to execute various applications and/or programs of terminal device 200 at an application layer of terminal device 200, such as an operating system (OS), a user interface (UI) for supporting user interaction with terminal device 200, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may be a memory circuitry or storage element of terminal device 200, such as a hard drive or another such permanent memory device. Although not explicitly depicted in FIG. 2, the various other components of terminal device 200 shown in FIG. 2 may additionally each include integrated permanent and non-permanent memory components, such as for storing software program code, buffering data, etc.

Terminal device 200 may also include RFI generating devices 220 which may be the source of RFI which interferes with the operation of integrated wireless antenna 202. The operating points of RFI generating devices may generate RFI at an operating frequency range of radio modems and then may be picked up by antenna 202 through coupling 222. Terminal device 200 may also include power management controller (PMC) 218. PMC 218 may interface and manage communication between devices of terminal device 200.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 120. If the current radio access connection degrades, terminal devices 102 or 104 may seek a new radio access connection with another network access node of radio communication network 100; for example, terminal device 104 may move from the coverage area of network access node 120 into the coverage area of network access node 110. As a result, the radio access connection with network access node 120 may degrade, which terminal device 104 may detect via radio measurements such as signal strength or signal quality measurements of network access node 120. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

This disclosure provides various aspects for devices and methods to avoid RFI in a wireless communication system. Dynamically avoiding RFI enables wireless communication devices to avoid RFI from RFI generating devices at a point in time and for as long as required for successful wireless operation. Dynamically avoiding RFI in real time minimizes the potential impact on performance and functionality of wireless communications and only invokes mitigation techniques when required for operation.

Compared to other physical design constraints or static RFI avoidance, dynamic RFI avoidance minimizes the impact on the power and performance of the wireless communication system. Dynamic RFI avoidance provides a cost-effective method with little or no impact to the PCB form factor or mechanical and thermal complexities. Additionally, the highly dynamic RFI avoidance may use device to device communication which may be completed in microseconds and create a seamless user experience.

Many wireless communication systems may implement physical design constraints to avoid RFI. For example, the wireless communication system may include shielding, antenna keep out zones, and/or printed circuit board (PCB) layout and routing rules to avoid RFI.

Physical design constraints to avoid RFI may have multiple limitations. For example, shielding and complex PCB layout and routing rules increase the Z-height and PCB area leading to increased cost. Type-4 PCBs are necessary to breakout the pinout of system-on-chip (SOC)s and meet shield grounding requirements which again add to cost. Shield grounding requires many closely spaced vertical interconnect access (VIA)s, connecting the periphery of the shield to the PCB ground plane because shielding is not very effective unless it is well grounded. The need to keep shielding continuous may cause thermal performance issues because it may lack gaps or holes for ventilation. Current shielding solutions are not effective enough for ultra-high frequencies such as 5 GHz-7 GHz or mmWave Wi-Fi/Cellular frequency bands.

Static RFI Avoidance is typically not feasible nor practical in a functioning system. For example, permanently setting all of the devices' operating frequencies and conditions such that RFI always falls outside of the radio operating frequencies to eliminate any RFI in the system. Setting fixed double data rate (DDR) speeds or avoiding highest frequency points can result in non-optimal dynamic random-access memory (DRAM) settings, impacting power and performance. Some operating frequencies are dictated by external industry specifications. In other cases, the desired wireless operational channel can be dictated by the network (e.g. channels used by access points or cellular base stations).

It is desirable to avoid the complexities of physical designs and static RFI avoidance techniques implementing a method of dynamic RFI avoidance.

Figure 3:
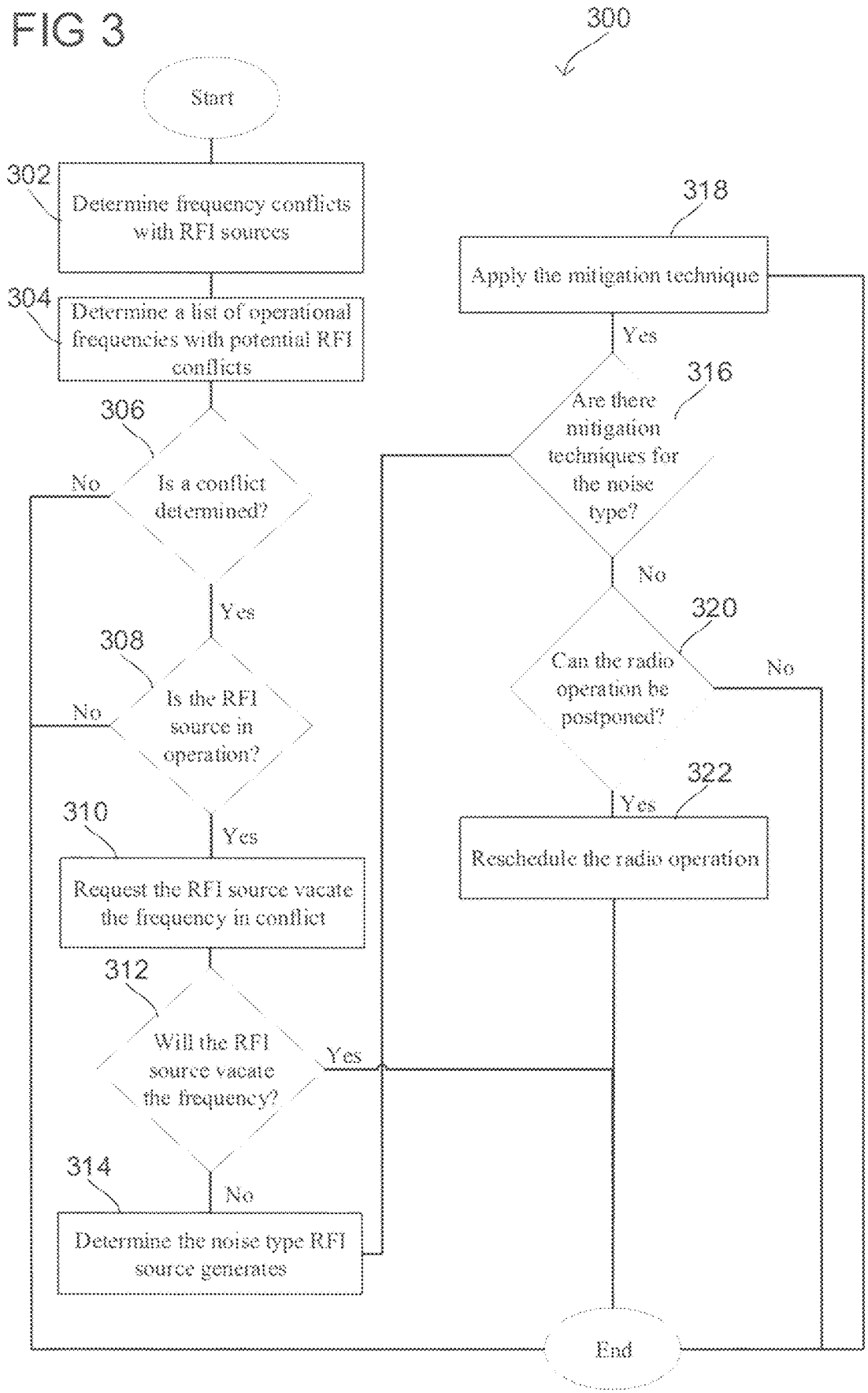
FIG. 3 shows an exemplary flow chart for avoiding and mitigating RFI according to some aspects.

FIG. 3 illustrates a method for avoiding RFI according to some aspects. FIG. 3 shows an exemplary method 300 according to some aspects. A wireless communication device may determine a list of potential RFI generating devices at step 302. Other devices generating RFI may include processors, bus interfaces, memory, voltage regulators or any other active and passive components capable of generating RFI. The operating point may include an operating frequency, voltage, and bandwidth among other parameters relevant to RFI generation. Additionally, the RFI generating device may also generate higher order ($2^{nd}$ or $3^{rd}$ or der) impacts or harmonics based on one or more parameters of the operating point. For example, The RFI generating device may generate multiple harmonics at a positive integer multiple of the operating frequency of its operating point.

An RFI generating device may be any relevant device that operates at an operating point which interferes with operation of the wireless communication device. The RFI generating device operating at its operating point may generate direct frequency interference with the wireless communication device. Alternatively, the RFI generating device operating at its operating point may generate interference for the wireless communication device at harmonics of a frequency of one or more of the operating point parameters. During a system boot, a discovery of RFI generating devices (information regarding the RFI generating devices) is gathered. For example, information regarding a device type, its operating frequencies, data rate, voltage, timing calibration, pre-characterized bandwidth of RFI, relevant technology, among other information. Device type information may include information that the RFI generating device is a memory device such as DDR5, LPDDR5, or LPDDR4, etc. Bandwidth information may include information that the RFI generating device operates at broad band, wide band, or narrow band. At step 304, the wireless communication device determines a list of potential conflicts between its uniquely defined operating frequencies and the operating points of the RFI generating devices. At step 306, the wireless communication device determines if a conflict exists between its operating frequency and an operating point of an RFI generating device. At step 308, the wireless communication device determines if the RFI generating device associated with the conflict is operating at that point in time, thus generating RFI for the wireless communication device. If the RFI generating device is not in operation or is in operation at the frequencies where there's no RFI, the wireless communication device may operate without interference. If the RFI generating device is operating at step 310, at an operating point which generates RFI for the wireless communication device, the wireless communication device may request that the RFI generating device vacate its operating or interfering frequency. For example, by ceasing operation, operating at a different frequency, or postponing its operation. At step 312, the wireless communication device determines if the RFI generating device has accepted the request and vacated the operating or interfering frequency. If the RFI generating device has vacated the operating or interfering frequency, the wireless communication may operate without interference. If not, at step 314 the wireless communication device determines the type of RFI generated by the RFI generating device. At step 316, the wireless communication device may determine if there are alternative mitigation techniques to reduce the impact of RFI based on the type of RFI generating devices or technology such as SOC integrated voltage regulators, LPDDR, or DDR. If there are alternative mitigation techniques based on the RFI type, at step 318 wireless communication device applies the mitigation techniques. Mitigation techniques may be implemented at the wireless communication device, the RFI generating device, or any other device of the system. If there are no mitigation techniques, at step 320 wireless communication device determines if its operation may be postponed to a later time. For example, at the next available time when there is no RFI. If the operation may be postponed, at step 322, wireless communication device postpones its operation. If not, the wireless communication device may operate regardless of the RFI generated and potentially suffer the consequences of such interference. In this case, the operation of the wireless communication device is opportunistic, since there is no guarantee for noise free functionality.

In a system an RFI generating device may interfere with performance of a wireless communication device. The RFI generating device may operate at a certain frequency, which emits radio frequency (RF) energy, creating RFI. The RFI impacts wireless communication functionality, degrading performance and possibly inhibiting or delaying a connection. However, the RFI does not have to come from the exact operating point of an RFI generating device. RFI may be derived from the operating point of an RFI generating device. For example, RFI may be generated from an integer multiple of the operating point of the RFI generating device or harmonics.

RFI generating devices may impact a wireless communication device while it is in one of several states. For example, the wireless communication device may be in a scanning state, associating state, operating state, or any other state.

During the scanning state, the wireless communication device may discover candidate Access Points (AP) or Base Transceiver Stations (BTS) at all available frequency channels. Scanning may be performed without user or Host OS/Driver awareness. In the presence of strong RFI in the radio frequency channels, the wireless communication device may fail to discover an AP/BTS or incur a delay in connection with the AP/BTS. Such a failure or delay may have severe user impact. Dynamic RFI avoidance may reduce the length of time spent during scanning state and lead to a successful scanning operation.

During the associating state, the wireless communication device may connect to an AP or BTS. Compared to the scanning operation, which is performed at basic data rates and is less susceptible to RFI, the association operation is performed at higher data rates and much more prone to RFI impact. Failing to associate to an AP or BTS may result in severe, user visible, impact.

During the operating state, the wireless communication device may send and receive network traffic. RFI in an operating radio frequency channel may degrade operation performance. In specific scenarios, throughput degradation of up to 70% may be observed.

RFI generating devices may be separated into flexible and inflexible categories. Flexible RFI generating devices may shift their operation to a different operating point or avoid operation upon receipt of a request from the wireless communication device. The flexibility of the operating point is a design choice but its deviation from the normal frequency should be larger than radio operation channel bandwidth. As part of each system component design, RFI avoidance requirements may be implemented in the design of a device. The design may include a set of alternative operating frequencies or voltage points for potential RFI mitigation.

Inflexible RFI generating devices may be unable to operate at an alternate frequency. In this case, the wireless communication device may attempt to apply local mitigation techniques based on the type of RFI or postpone its operation to avoid RFI from inflexible RFI generating devices. The wireless communication device may try to associate to other wireless networks which are not operating at frequencies affected by RFI. Associating with other networks may be subject to specific applications and usage scenarios and not always be applicable. For example, when operating a WiFi peer to peer network or Soft AP, the wireless device is in charge of selecting the operating channel (differently from regular BSS network, when the channel is dictated by the Access Point). When the selected channel suffers from RFI, the wireless device will select another channel, free from RFI channel.

RFI types may be classified into three categories; broadband noise, wideband noise, and narrowband noise. It should be understood that other categories may be defined. Broadband noise is typically generated from data traffic. Wideband noise is typically generated from a spread spectrum clock. For example, fully integrated voltage regulator (FIVR), high speed input/output (HSIO), and DRAM may cause broadband noise. A spike from HSIOs data rise/fall time mismatch or DDR5/LPDDR5 technology may generate wideband RFI that interferes with Wi-Fi-6E high bands, supporting 5-7 GHz. The Interference will impact scanning and associating operations and may potentially inhibit connection. When connection is established with an AP or BTS, one may expect potential throughput degradation of up to 70% in the presence of wideband noise. Narrowband noise, or spurs, is typically generated from a non-spread spectrum clock. For example, Display/HDMI/Audio/Camera devices use non-spread spectrum clocks that are generated from a phase locked loop (PLL) and those IO devices and physical interface routings generate RFI.

Figure 4:
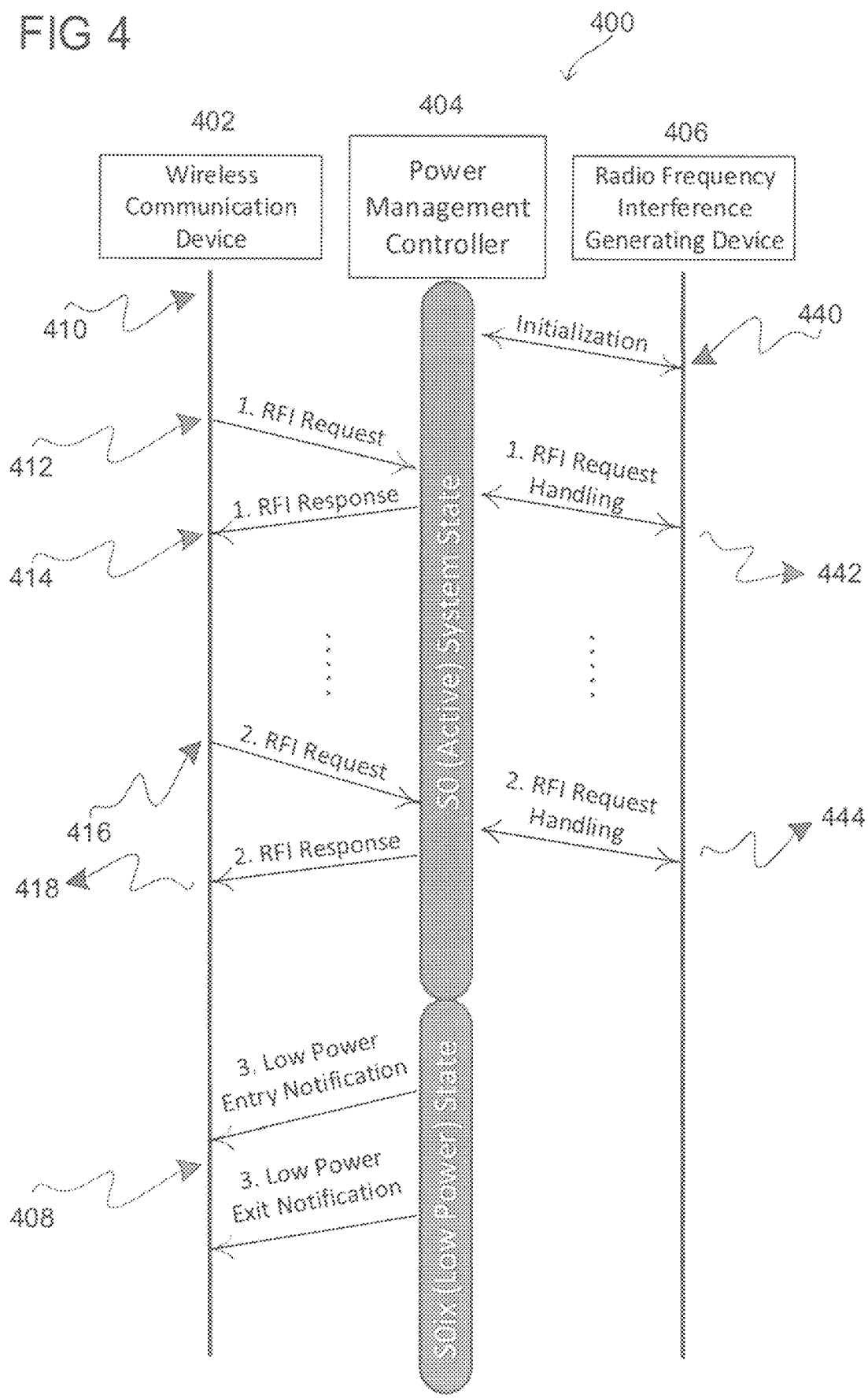
FIG. 4 shows an exemplary method for avoiding RFI according to some aspects.

According to some aspects, the RFI avoidance method 300 may be implemented as a platform level method. For example, FIG. 4 illustrates method 400 implementing dynamic RFI avoidance at the platform level. Method 400 includes a power management controller 404. PMC 404 may interface with several devices operating in a platform of a system to control the amount of power distributions which directly impact a system performance. Wireless communication device 402 and devices 406 may operate on the same platform. RFI generating devices 406 may generate RFI and degrade the operation of wireless communication device 402. During an RFI generating device 406 initialization phase 440, PMC 404 receives a list of required information for dynamic RFI avoidance from each RFI generating device 406. The list may include information for each device including operating condition, frequency, voltage, status, operating bandwidth etc. During initialization phase 410 of wireless communication device 402 may receive a list of operating point of RFI generating devices 406 via PMC 404. In certain system conditions, RFI generating devices 406 may be idle during low power states. PMC 404 may send notifications 408 to wireless communication device 402 indicating which, if any, RFI generating devices 406 are entering or exiting an idle state. If an RFI generating device 406 is in an idle state, wireless communication device 402 may operate at any operating frequency channel without RFI. This avoids excess communication to 406 or wake-ups of power-hungry devices, which saves power or extends the system battery life, and increases speed. Wireless communication device 402 may receive a list of RFI affected frequency channels during its initialization 410. The list may include affected radio frequency bands and RFI generating devices 406 configured to operate at an operating point that will affect the radio frequency bands. If the wireless communication device 402 will operate at an affected frequency channel, device 402 may perform a handshake with the RFI generating device 406 before beginning operation. PMC 404 may manage handshakes between wireless communication device 402 and RFI generating devices 406. For example, wireless communication device 402 may send a request 412 for an RFI generating device 406 to vacate an operating point. PMC 404 receives request 412 and forwards it to RFI generating device 406. RFI generating device 406 may accept or decline request 412. At scenario 442, RFI generating device 406 accepts request 412 to vacate the operating point. Device 406 notifies PMC 404 of the handling of request 412. PMC 404 relates the RFI generating devices 406 response 414 to wireless communication device 402. Wireless communication device 402 may begin operation based on the response 414 at the operating frequency without RFI. As another example, wireless communication device 402 may send a request 416 for an RFI generating device 406 to vacate an operating point. PMC 404 receives request 416 and forwards it to RFI generating device 406. RFI generating device 406 may accept or decline request 416. At scenario 444, RFI generating device 406 rejects request 416 to vacate the operating point. Device 406 notifies PMC 404 of the handling of request 416. PMC 404 relates the RFI generating device response 418 to wireless communication device 402. Upon receipt of response 418 that RFI generating device 406 will not vacate the operating point, wireless communication device 402 may implement alternate operating procedures. For example, wireless communication device 402 may send the second alternative operating point request following the same protocol as 412 or choose to postpone its operation or implement other mitigation techniques based on information gathered about the RFI generating device 406.

As previously described with regard to FIG. 4, the PMC may serve as the focal point and include intelligence to communicate with all devices in a system. Alternatively, the wireless communication device may include the intelligence to directly communicate with other devices included in the system. In both scenarios, communication between the wireless communication device and the RFI generating device is in real-time and may include information regarding the RFI generating device such as operating frequency, technology, voltage, and bandwidth.

The method of avoiding RFI at an operating frequency may include communications between the wireless communication device and RFI generators including a real-time handshake between the RFI generating device and the wireless communication device. The focal point may include intelligence for formatting messages according to a communications protocol. For example, a handshake may include a communications protocol sending an RFI request and receiving an acknowledgment (ACK) or a negative-acknowledgment (NACK) signal. If the wireless communication device receives an ACK, it knows the RFI generating device will not use the operating point defined in the request. If the wireless communication device receives a NACK, it will determine if it may implement an alternative operating method.

The wireless communication device may receive a list of restricted wireless channels that require a handshake operation at beginning of the wireless communication system operation (e.g., cold boot). The list may map a list of operating points of potential RFI generating devices. The OEM may update the list based on their own RFI testing or the input from RFI detection tools applied at the platform level. Updating the list may be required when one or multiple RFI generating device configurations (replacements or upgrades) are altered. The list may be compiled once and loaded into the wireless communication device's firmware or a system memory.

Before the wireless communication device initiates operation at a restricted wireless channel, it may initiate an RFI avoidance request to an RFI generating device. The RFI generating device may accept the request and avoid operation at a point that interferes with the restricted wireless channel, or reject the request and continue to operate at that operating point.

If the RFI generating device accepts the request, it may avoid operation at a given voltage and/or frequency. After the RFI generating device begins to operate at an alternative operation voltage and/or frequency, or ceases operation, it may notify the wireless communication device and the wireless communication device may continue the operation at the wireless channel without RFI.

If the RFI generating device rejects the request, the wireless communication device may attempt to mitigate the RFI in an alternative way. The wireless communication device may apply local noise mitigation techniques. For example, if the wireless communication device determines that a PLL is generating RFI in spurs, it may apply local spur cancelation techniques. Additional mitigation techniques may include frequency domain tone scaling or noise whitening. Each mitigation technique may be applied depending on a determination of the type of RFI communicated as part of communication with the RFI generating device. For example, a handshake between the wireless communication device and the RFI generating device may include information about the RFI generating device, such as RFI bandwidth information. The wireless communication device may include intelligence to determine the best mitigation technique given for the given RFI type resulting in the best possible user experience.

If no alternative mitigation techniques are available, the wireless communication device may postpone its operation to a later point in time when no RFI is expected. Certain operations on given wireless channels may be resumed at a later point in time and avoid RFI interference. For example, postponing a channel calibration operation may be accomplished without negatively affecting wireless device performance.

If postponing operation is not possible, the wireless communication device may operate in the presence of RFI at the risk of performance degradation.

A focal point for communication between the RFI generating devices and the wireless communication device may simplify operation. For example, a PMC may serve as a focal point. However, other devices may also serve as a focal point.

The PMC may aggregate the requests from the wireless communication device and information from the RFI generating devices. PMC may monitor the operating state of the RFI generating devices and may respond on behalf of the RFI generating device when they are in an idle state (not operating). For example, when DDR is in a self-refresh mode or an audio device implementing a PLL clock is not operating.

A wireless communication device may initiate the RFI request when starting or ending its operation at a given frequency channel. When the operation is complete, the RFI mitigation/avoidance may no longer be required. The PMC may manage RFI avoidance and notify the RFI generating device that it may resume operation at the operating point impacting the radio frequency channel previously occupied by the wireless communication device. If the RFI generating device's performance or functionality is minimally or not impacted by operating at a different frequency/voltage point, it may continue to operate at the alternate frequency.

The RFI avoidance handshake between the wireless communication device and the RFI generating device may operate differently depending on different phases or scenarios. During the initialization phase of the wireless communication device, Host level software or OEM BIOS may communicate a list of potentially impacted wireless channels to the wireless communication device. The list may include potential RFI generating devices and their operational frequencies or other interfering frequencies, e.g. harmonics. The platform level focal point may manage the communication of the list. This list may be generated once per life of the system (upon cold boot) or routinely updated.

During the operation phase of the wireless communication device, it may request RFI protection before it begins operation at an impacted wireless communication channel. After the request is sent, several scenarios may occur.

In a first scenario, the wireless communication device sends a request message to the focal point, such as a PMC. The focal point identifies the relevant RFI generating device and sends the request message directly to the RFI generating device to vacate the voltage/frequency the wireless communication device identified. The RFI generating device responds to the wireless communication device via the focal point with the status of the request. For example, the request is accepted and that the RFI generating device has shifted operation to an alternative frequency. The request/response handshake is expected to be completed within few milliseconds to allow real-time operation.

In a second scenario, after receiving the request, the RFI generating device responds to the wireless communication device that it is not able to shift its operating point. The response message includes the type of RFI generating device and the RFI noise profile can be derived from that. The wireless communication device may attempt to apply alternative local mitigation techniques or postpone its operation if possible.

In a third scenario, the focal point indicates that the RFI generating device is in an idle state. For example, the system entered a low power state and/or the RFI generating devices are not operating. No RFI mitigation is required in this scenario. The focal point notifies the wireless communication device of system state and the wireless communication device does not require wireless channel protection until the system exits the low power state.

FIGS. 5A and 5B help illustrate mitigation techniques that may be used by a system to reduce the effect of RFI on its operation.

As previously stated, devices may be designed to operate at alternative operating points (voltage/frequency) to balance the power and performance. The PMC can use alternative operating points to avoid RFI. As an example, a DDR memory device design may include dynamic voltage and frequency scaling (DVFS) which is a modern PC feature to balance the power consumption (lowest frequency) and the performance (highest frequency). The following example relates to a WLAN communication, but it should be noted that the methods and concepts may be applied to Bluetooth, wireless wide area network (WWAN), ultrawideband (UWB), or other wireless communication devices impacted by RFI.

DDR may be designed with specific DVFS points to avoid generating RFI impacting wireless communication devices. Alternate DDR DVFS points may be optimized for radio communications but may not be optimal for the memory device's performance if requests for alternating DVFS points are frequent. The alternate DVFS points may be predefined and chosen to move the DDR data rates into a different frequency to avoid RFI to the wireless channel frequency band in use or designated for future use. At the same time, the alternative DVFS point may alter power supply voltage level for power and performance optimizations. Ideally, the change results in minimal performance degradation of the memory device and minimum power consumption tradeoff.

An example of alternate rate points for a platform, include a LPDDR5 memory device and wireless network interface card (WNIC) radio communication device. FIG. 5A illustrates 6 GHz Wi-Fi Channel assignment 500. The DVFS point primary data rate (502) for the memory device is LP5-6400. The DVFS point alternate data rate (504) for a memory device is LP5-6200. In this example, the platform may support 6 GHz Wi-Fi up to 160 MHz bandwidth channels. A memory device operating at a primary data rate of LP5-6400 may generate RFI which interferes with the wireless communication. RFI around 6400 MHz, which may include a –0.5% spread spectrum clock effect, could impact Wi-Fi channels 85, 89, 93, 83, 91, 87 or 79 of the 6 GHz band as illustrated by the shaded region of 502. Changing the data rate to 6200 MT/s will clear those Wi-Fi channels for communication and eliminate generating RFI at the wireless communication device operating frequency. The change from 6200 MT/s is a minimal deviation from 6400 MT/s to clear the Wi-Fi channels from RFI noise. If the WNIC operation at the Wi-Fi channels ceases, the DDR memory device may resume operation at 6400 MT/s.

In this example, the memory device is configured with one alternate point. FIG. 5B illustrates a DVFS model 510 with four points 512. Each DVFS point 512 includes a primary rate 514. If necessary, an alternate rate 516 may be defined for a DVFS point 512. For example, DVFS point 518 includes a primary rate 514 at 6400 MT/s and an alternate rate 516 at 5200 MT/s. Other DVFS points are not interfering in the Wi-Fi operation band; therefore, no alternative point is assigned. But if the DVFS point must be allocated at a frequency that will cause interference in the Wi-Fi band, an alternative point can be utilized to avoid RFI.

The alternate rate of DDR LP5-6200 represents a 3.125% DDR reduction in speed at certain period of time (not all the times). This results in significantly lower performance impact than a static solution. It should be noted that other RFI generating devices may include DVFS or other RFI avoidance techniques.

FIG. 6 illustrates an exemplary method of performing dynamic RFI avoidance in a system according to some aspects. FIG. 6 shows exemplary method 600. As shown in FIG. 6, method 600 includes determining whether a further device is generating a radio frequency interference at an operating frequency (stage 602); transmitting a request message to the further device requesting that the further device vacate the operating frequency based on the determination that the further device is generating radio frequency interference (stage 604); receiving a response message from the further device (stage 606); and generating an instruction based on the response message (stage 608).

In the following, various aspects of the present disclosure will be illustrated:

In Example 1, a method, including determining whether a further device is generating a radio frequency interference at an operating frequency; transmitting a request message to the further device requesting the further device vacate the operating frequency based the determination that the device is generating radio frequency interference; receiving a response message from the further device; and generating an instruction based on the response message.

In Example 2, the subject matter of Example 1 may optionally further include determining at least one further device, wherein the further device is configured to generate the radio frequency interference.

In Example 3, the subject matter of any one of Examples 1 and 2 may optionally further include managing the request message and the response message via a central device.

In Example 4, the subject matter of any one of Examples 1 to 3 may optionally further include formatting the request message and the response message.

In Example 5, the subject matter of any one of Examples 1 to 4 may optionally further include receiving a device state message from the further device.

In Example 6, the subject matter of any one of Examples 1 to 5 may optionally further include wherein the device state message comprises a sleep state of a further device.

In Example 7, the subject matter of any one of Examples 1 to 6 may optionally further include the response message comprises information that the further device will vacate the operating frequency.

In Example 8, the subject matter of any one of Examples 1 to 7 may optionally further include wherein the response message is an acknowledgment message.

In Example 9, the subject matter of any one of Examples 1 to 8 may optionally further include wherein the response message comprises information that the further device will not vacate the operating frequency.

In Example 10, the subject matter of any one of Examples 1 to 9 may optionally further include determining a bandwidth of the radio frequency interference.

In Example 11, the subject matter of any one of Examples 1 to 10 may optionally further include obtaining a predefined list of operating techniques.

In Example 12, the subject matter of any one of Examples 1 to 11 may optionally further include transmitting a reschedule signal to the further device, wherein the reschedule signal comprises instructions to the further device to reschedule its operation.

In Example 13, the subject matter of any one of Examples 1 to 12 may optionally further include generating an instruction to a wireless communication device to postpone operation.

In Example 14, the subject matter of any one of Examples 1 to 13 may optionally further include generating an instruction to a wireless communication device to continue operation.

In Example 15, the subject matter of any one of Examples 1 to 14 may optionally further include wherein the response message is a negative acknowledgment message.

In Example 16, the subject matter of any one of Examples 1 to 15 may optionally further include selecting an operating technique from the predefined list of operating techniques based on the determined bandwidth of the radio frequency interference.

In Example 17, the subject matter of any one of Examples 1 to 16 may optionally further include determining at least one conflict frequency, wherein the further device is configured to generate the radio frequency interference at the conflict frequency.

In Example 18, the subject matter of any one of Examples 1 to 17 may optionally further include determining that the at least one device is operating.

In Example 19, the subject matter of any one of Examples 1 to 18 may optionally further include wherein the radio frequency interference is generated from a harmonic frequency of the operating frequency.

Example 20 is a wireless communication device including one or more processors configured to: determine whether a further device is generating radio frequency interference at an operating frequency; transmit a request message to the further device requesting the device vacate the operating frequency based the determination that the device is generating radio frequency interference; receive a response message from the further device; and generate an instruction based on the response message.

In Example 21, the subject matter of Example 20 may optionally further include wherein the one or more processors are further configured to determine at least one further device, wherein the further device is configured to generate the radio frequency interference.

In Example 22, the subject matter of any one of Examples 20 and 21 may optionally further include a power management controller, wherein the power management controller is configured to receive the request message from the wireless communication device and transmit the request message to the further device.

In Example 23, the subject matter of any one of Examples 20 to 22 may optionally further include a power management controller, wherein the power management controller is configured to receive the response message from the further device and transmit the response message to the wireless communication device.

In Example 24, the subject matter of any one of Examples 20 to 23 may optionally further include wherein the one or more processors are further configured to format the request message and the response message.

In Example 25, the subject matter of any one of Examples 20 to 24 may optionally further include wherein the one or more processors are further configured to receive a device state message from the further device.

In Example 26, the subject matter of any one of Examples 20 to 25 may optionally further include wherein the device state message comprises a sleep state of a further device.

In Example 27, the subject matter of any one of Examples 20 to 26 may optionally further include, wherein the response message comprises information that the further device will vacate the operating frequency.

In Example 28, the subject matter of any one of Examples 20 to 27 may optionally further include wherein the response message is an acknowledgment message.

In Example 29, the subject matter of any one of Examples 20 to 28 may optionally further include wherein the response message comprises information that the further device will not vacate the operating frequency.

In Example 30, the subject matter of any one of Examples 20 to 29 may optionally further include wherein the one or more processors are further configured to determine a bandwidth of the radio frequency interference.

In Example 31, the subject matter of any one of Examples 20 to 30 may optionally further include wherein the one or more processors are further configured to obtain a predefined list of operating techniques.

In Example 32, the subject matter of any one of Examples 20 to 31 may optionally further include wherein the one or more processors are further configured to transmit a reschedule signal to the further device, wherein the reschedule signal comprises instructions to the further device to reschedule its operation.

In Example 33, the subject matter of any one of Examples 20 to 32 may optionally further include wherein the one or more processors are further configured to generate an instruction to a wireless communication device to postpone operation.

In Example 34, the subject matter of any one of Examples 20 to 33 may optionally further include wherein the one or more processors are further configured to generate an instruction to a wireless communication device to continue operation.

In Example 35, the subject matter of any one of Examples 20 to 34 may optionally further include wherein the response message is a negative acknowledgment message.

In Example 36, the subject matter of any one of Examples 20 to 35 may optionally further include wherein the one or more processors are further configured to select an operating technique from the predefined list of operating techniques based on the determined bandwidth of the radio frequency interference.

In Example 37, the subject matter of any one of Examples 20 to 36 may optionally further include wherein the one or more processors are further configured to determine at least one conflict frequency, wherein the further device is configured to generate the radio frequency interference at the conflict frequency.

In Example 38, the subject matter of any one of Examples 20 to 37 may optionally further include wherein the one or more processors are further configured to determine that the at least one device is operating.

In Example 39, the subject matter of any one of Examples 20 to 38 may optionally further include wherein the further device is configured to generate a harmonic frequency of the operating frequency of the wireless communication device.

In Example 40, the subject matter of any one of Examples 20 to 39 may optionally further include wherein the further device is configured to operate at an alternative operating point.

In Example 41, the subject matter of any one of Examples 20 to 40 may optionally further include wherein the alternative operating point comprises an alternative voltage.

In Example 42, the subject matter of any one of Examples 20 to 41 may optionally further include wherein the alternative operating point comprises an alternative frequency.

In Example 43 a wireless communication device including a memory configure to store instructions; one or more processors coupled to the memory to execute the instructions stored in the memory, wherein the processors are configured to: determine whether a further device is generating radio frequency interference at an operating frequency; transmit a request message to the further device requesting the device vacate the operating frequency based the determination that the device is generating radio frequency interference; receive a response message from the further device; and generate an instruction based on the response message.

In Example 44 a system including one or more devices according to Examples 20-42 configured to implement a method according to Examples 1-19.

In Example 45 a system including one or more devices according to Example 43 configured to implement a method according to Examples 1-19.

In Example 46 a device including one or more devices according to Example 43 further including one or more devices according to Examples 20-42.

In Example 47 one or more non-transitory computer readable media comprising programmable instructions thereon, that when executed by one or more processors of a device, cause the device to perform any one of the method of Examples 1-19.

In Example 48 a means for implementing any of the Examples 20-43.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature and are thus understood as capable of being implemented in a corresponding device. Likewise, it is appreciated that implementations of devices detailed herein are understood as capable of being implemented with a corresponding method. It is thus understood that a device corresponding to a method detailed herein may include one or more components configured to perform each aspect of the related method.

All acronyms defined in the above description additionally hold in all claims included herein.

What is claimed is:

1. A wireless communication device comprising one or more processors configured to:

determine whether a radio frequency interference (RFI) generating device is generating RFI at an operating frequency;

transmit a request message to the RFI generating device to request that the RFI generating device vacate the operating frequency based on the determination;

receive a response message from the RFI generating device; and generate an instruction based on the response message.

2. The device of claim 1, further comprising a power management controller, wherein the power management controller is configured to receive the request message from the wireless communication device and transmit the request message to the RFI generating device.

3. The device of claim 1, further comprising a power management controller, wherein the power management controller is configured to receive the response message from the RFI generating device and transmit the response message to the wireless communication device.

4. The device of claim 1, wherein the response message comprises information that the RFI generating device will vacate the operating frequency.

5. The device of claim 1, wherein the response message comprises information that the RFI generating device will not vacate the operating frequency.

6. The device of claim 5, wherein the one or more processors are further configured to determine a bandwidth of the RFI.

7. The device of claim 6, wherein the one or more processors are further configured to obtain a predefined list of operating techniques.

8. The device of claim 7, wherein the one or more processors are further configured to select an operating technique from the predefined list of operating techniques based on the determined bandwidth of the RFI.

9. The device of claim 5, wherein the one or more processors are further configured to transmit a reschedule signal to the further device, wherein the reschedule signal comprises instructions to the RFI generating device to reschedule its operation.

10. The device of claim 1, wherein the one or more processors are further configured to determine at least one conflict frequency, wherein the further RFI generating device is configured to generate the RFI at the conflict frequency.

11. The device of claim 1, wherein the RFI generating device is configured to generate a harmonic frequency of the operating frequency of the wireless communication device.

12. The device of claim 1, wherein the RFI generating device is configured to operate at least one alternative operating point.

13. A method, comprising:

determining whether a further generating device is generating RFI at an operating frequency of a wireless communication device;

transmitting a request message to the RFI generating device requesting the RFI generating device vacate the operating frequency based on the determination;

receiving a response message from the RFI generating device; and generating an instruction based on the response message.

14. The method of claim 13, further comprising receiving a device state message from the RFI generating device.

15. The method of claim 14, wherein the device state message comprises a sleep state of the RFI generating device.

16. The method of claim 13, wherein the response message comprises information that the RFI generating device will vacate the operating frequency.

17. The method of claim 13, wherein the response message comprises information that the RFI generating device will not vacate the operating frequency.

18. The method of claim 17, further comprising transmitting a reschedule signal to the RFI generating device, wherein the reschedule signal comprises instructions to the RFI generating device to reschedule its operation.

* * * * *

UNITED STATES PATENT AND TRADEMARK OFFICE
CERTIFICATE OF CORRECTION

PATENT NO. : 11,558,158 B2
APPLICATION NO. : 17/093679
DATED : January 17, 2023
INVENTOR(S) : Michael Shusterman et al.

It is certified that error appears in the above-identified patent and that said Letters Patent is hereby corrected as shown below:

In the Claims

Claim 9 at Column 20, Line 39, remove 'further' between 'the' and 'device' and insert --RFI generating--.

Claim 10 at Column 20, Line 44, remove 'further' between 'the' and 'RFI'.

Claim 13 at Column 20, Line 54, remove 'further' and insert --RFI-- instead.

Signed and Sealed this
Fourteenth Day of March, 2023

Katherine Kelly Vidal
*Director of the United States Patent and Trademark Office*